United States Patent [19]

Pierson

[11] Patent Number: 4,495,070
[45] Date of Patent: Jan. 22, 1985

[54] HORIZONTAL VACUUM BELT FILTER

[76] Inventor: Henri G. W. Pierson, Greenwood, Bozeat, Northamptonshire, England

[21] Appl. No.: 442,586

[22] Filed: Nov. 18, 1982

Related U.S. Application Data

[63] Continuation-in-part of Ser. No. 317,298, Nov. 2, 1981, abandoned.

[30] Foreign Application Priority Data

Jan. 10, 1981 [GB] United Kingdom ................ 8100710

[51] Int. Cl.³ ............................................. B01D 33/32
[52] U.S. Cl. .................................. 210/139; 210/196; 210/400; 210/406; 210/409
[58] Field of Search ............... 210/138, 139, 140, 400, 210/401, 783, 785, 406, 409, 100, 102, 768, 772, 196, 137

[56] References Cited

U.S. PATENT DOCUMENTS

| | | | |
|---|---|---|---|
| 3,870,641 | 3/1975 | Pierson | 210/400 |
| 3,992,298 | 11/1976 | Davis | 210/138 |
| 4,038,193 | 7/1977 | Van Oosten | 210/400 |
| 4,127,487 | 11/1978 | Havalda | 210/401 |
| 4,146,483 | 3/1979 | Lee | 210/400 |
| 4,243,527 | 1/1981 | Leonard | 210/785 |
| 4,292,173 | 9/1981 | Paramentier | 210/138 |

Primary Examiner—Richard V. Fisher
Assistant Examiner—Wanda L. Millard
Attorney, Agent, or Firm—Kenwood Ross; Chester I. Flavin

[57] ABSTRACT

A filter belt is progressed stepwise over successive vacuum boxes by a guide roller at the forward end of the upper run being extended from its retracted position to its full line position while vacuum to the boxes is shut off. A displaceable roller permits this by taking up any slack in the belt and return movement of the belt upon retraction of the foremost guide roller is prevented by a unidirectional arrangement in at least one of the rollers guiding the lower return run of the belt. Slurry is fed onto the belt by a first nozzle, optional wash liquor is fed onto the resultant filter cake by a second nozzle and optional recirculated wash liquor is fed by a third nozzle all under the influence of a control which provides for such feed only for a predetermined period of time during the actual movement of the belt.

1 Claim, 8 Drawing Figures

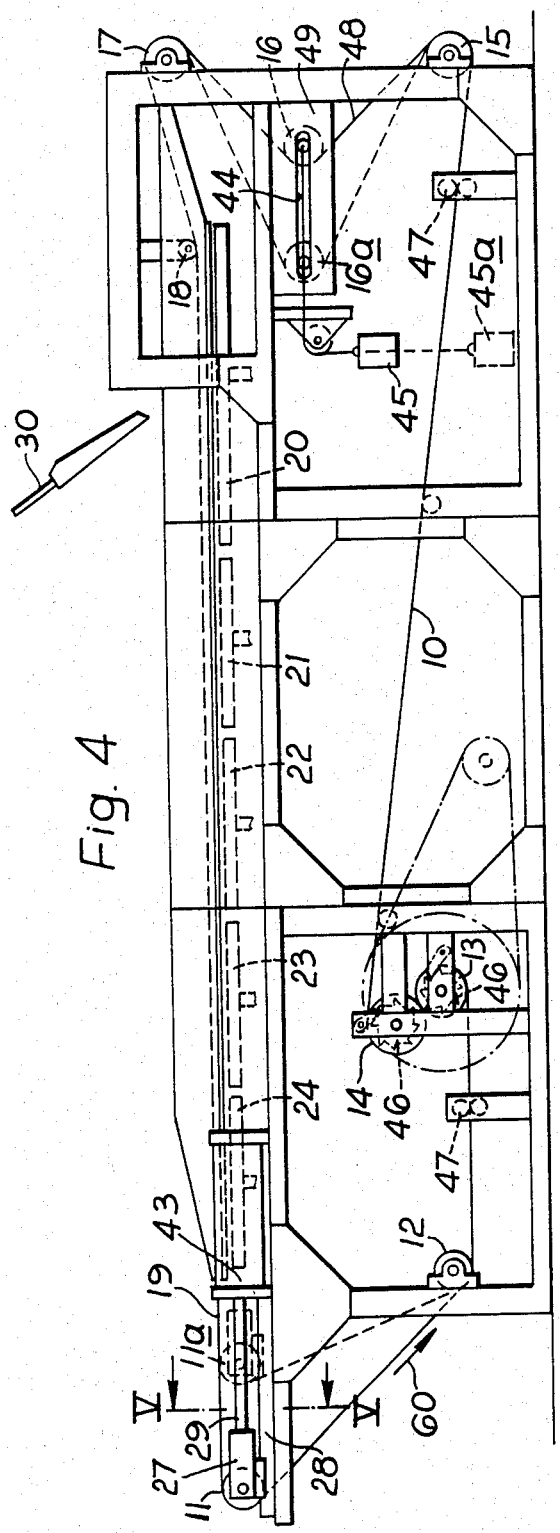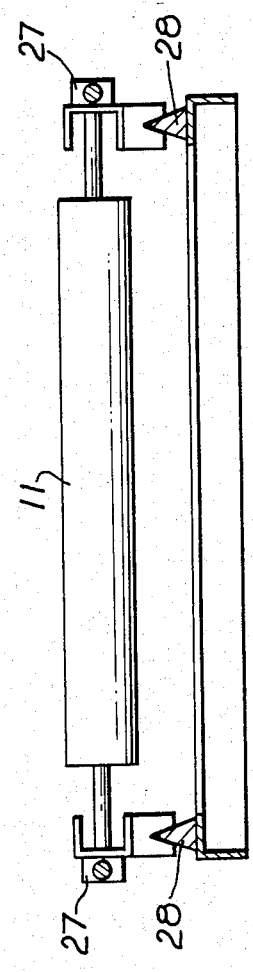
Fig. 4
Fig. 5

HORIZONTAL VACUUM BELT FILTER

FIELD OF THE INVENTION

This invention concerns a horizontal vacuum belt filter and is a continuation-in-part of my application Ser. No. 317,298, filed the 2nd day of Nov., 1981, now abandoned.

In particular, this filter is of the kind comprising an endless filter belt or cloth guided to provide a substantially horizontal upper run onto which is fed a slurry required to be filtered, the belt or cloth being adapted to be moved forward stepwise so as to progress successive portions of the upper run over a series of vacuum boxes which serve to suck away liquid from the slurry and to leave solid from the slurry deposited on the belt or cloth as filter cake.

BACKGROUND OF THE INVENTION

In certain known types of horizontal vacuum belt filter, for example as disclosed in my earlier U.S. Pat. No. 3,870,641 dated the 11th day of Mar. 1975, the filter belt or cloth, and with it the filter cake, is displaced intermittently in discrete increments. In order to permit the displacement, the vacuum system connected to the vacuum boxes is switched off, and the filter belt or cloth, with the cake and/or slurry thereon, is displaced in a discrete increment, after which the vacuum is switched on again, this sequence of operations being repeated continuously.

In other types of known horizontal vacuum belt filters, e.g. as disclosed in U.S. Pat. No. 4,038,193 (van Oosten), the filter belt or cloth, with the filter cake, moves continuously but the vacuum boxes travel intermittently backwards and forwards therebeneath, each period of backward travel occurring during a period whilst the vacuum is switched off.

One of the main reasons for the increased use of horizontal vacuum belt filters in recent years is that they permit vastly improved cake washing efficiency compared to rotary drum and other filters. Nowadays, however, the pharmaceutical and fine chemical industries in particular tend to demand even more stringent cake washing requirements. There requirements are not only stringent in terms of ultimate cake purity but also in terms of the amount of wash liquor used. The reasons for this are easy to understand. Either the wash liquor goes to waste and may cause an effluent problem, or, the wash liquor is an expensive medium in its own right so that restriction of its use is desirable, or, the final wash liquor is a valuable product and has to be recovered through multi-stage evaporation.

Initially, reduced volumes of wash liquor were achieved by introducing multi-stage counter-current washing, but practical difficulties soon discouraged this system, further limiting the amount of wash liquor used. To achieve efficient cake washing, it is obviously necessary for the wash liquor to cover the entire width of the cake on the belt. It has been found in practice that in order to cover a continuously moving slab of filter cake a minimum volume of approximately 5 to 6 liters (1.10 to 1.32 gallons) per minute per meter (39 inches) width and more practically something approaching twice that volume is required. In theory this figure could be reduced by use of fine sprays, but in practice the spray nozzles simply became blocked or the rate of flow was insufficient to ensure adequate pressure and distribution of the liquor issuing from the nozzle. Alternatively, an overflow-weir system might theoretically provide a small rate of flow on a continuous basis. However, the laws of hydraulics are such that the minimum flow required to draw an even film over the lip of a weir is approximately the above-mentioned amount of 5-6 liters per minute per meter width. In other words, the process requirements dictated by certain manufacturers meant that the desired volume of wash liquor was considerably less than the volume necessary to achieve a hydraulic practicality.

A similar problem arises in relation to the supply of slurry to the filter belt of a horizontal vacuum belt filter. Most efficient washing, having regard to the final purity of the filtered product, is achieved when a thin, even layer of slurry is deposited on the belt. In practice, however, there is always a minimum and frequently a maximum speed at which slurry can be pumped through a pipe. If the velocity of the slurry is too slow, settling out and blockage of the pipeline occurs and if the flow is too high (as may occur in a pipe of very small diameter) damage may be caused to the fragile particles in the slurry and/or pressure may build up to an unacceptable limit. In practice, therefore, it is extremely difficult to pump slurry at a rate which, in theory, is highly desirable to obtain the correct quantity of slurry on the belt.

PRIOR ART

No previously known apparatus has been designed to tackle the problem of limiting or controlling the flow of wash liquor and/or slurry to a horizontal filter belt so as to achieve an even thin spread of slurry and adequate washing with a small quantity of wash liquor.

The filter apparatus described in the above-mentioned U.S. Pat. No. 4,038,193 includes distribution nozzle for applying slurry or wash liquor to a continuously moving belt at a continuous rate and thereby has the abovementioned disadvantage that the amount of slurry or wash liquor supplied cannot in practice be reduced beyond a certain limit dependent on hydraulic principles.

U.S. Pat. No. 3,966,610 (Gibbs) describes apparatus wherein liquor is removed from above the filter cake, thereby improving the draining rate. This is completely different from the presently proposed apparatus. U.S. Pat. No. 4,142,971 (Le Fur et. al) and U.S. Pat. No. 4,276,168 (Bastgen) each disclose moveable rollers for tensioning a filter belt, but do not disclose a moveable roller which serves to move the filter belt intermittently, as is proposed in the present invention. The vibrator described in U.S. Pat. No. 4,243,527 (Leonard) serves to clean a screen through which earth drilling fluid is filtered and does not agitate a horizontal filter belt on which slurry or filter cake is deposited as is preferably required in the present case. Finally U.S. Pat. No. 4,292,173 describes a vertical filtering device having a timer (of an undisclosed nature) to automate the sequence of events comprising closing together the layers of the device, supplying slurry to each, washing the resultant cake in each layer, applying a vacuum, opening the device and progressing the layers to a cake discharge position.

SUMMARY OF THE INVENTION

An object of the present invention is to provide a construction of intermittently-moving horizontal vacuum belt filter in which the above-discussed problems are overcome.

With this object in view, the present invention provides a horizontal vacuum belt filter of the kind above referred to having liquid feed means for supplying liquid (which may be slurry required to be filtered or may be wash liquor for washing filter cake on the belt or cloth) to the belt or cloth characterised in that it comprises a control which is operative, upon commencement of each forward movement of the belt or cloth, to actuate the feed means to supply its liquid to the belt or cloth during a predetermined period of time during its forward movement.

A preferred construction of the belt filter of the invention has its respective liquid feed means for the slurry and for the wash liquor, with each feed means having its own control to supply its slurry and its wash liquor respectively for respective predetermined periods.

Each control may be variable.

Each control conveniently comprises, the liquid supply means, a by-pass valve connected to a time delay unit, which may be variable in its setting, which serves, after a predetermined period of opening of the valve to an outlet of the liquid feed means, to switch off the supply to the outlet.

Where the liquid feed means serves to supply the slurry, in order to control cake thickness the by-pass valve would be fitted in the feed line to the slurry feed outlet and this by-pass valve is connected to the time delay unit. This time delay unit then takes its impulse from the forward movement of the filter belt or cloth and during a preset time, the valve remains in a position corresponding to the feeding of slurry to the belt or cloth, until the desired predetermined period has expired and a known volume of slurry has been supplied, whereupon the by-pass valve is activated to enable the slurry to be recirculated. Once the time delay unit has been set to give a required cake thickness, the frequency of the intermittent forward stepwise movement of the belt or cloth can be adjusted by the operator at will without in any way affecting the cake thickness, which is simply controlled by the time delay unit. In this manner a completely non-mechanical non-contact system is, for the first time, made available to permit cake thickness control.

The same principle applies where the liquid feed means serves to supply cake wash liquor. As mentioned previously, the normal problem lies in the difficulty in applying relatively small quantities, on a continuous basis, in order to achieve complete coverage. Using the time delay principle as discussed above, again the by-pass valve will be located in the wash liquor feed system and this valve will be actuated so that wash liquor is fed to the belt or cloth for a predetermined period each time when the cloth/cake moves forward. In this manner high pressures and high volumes can be used during the period that the wash liquor is being supplied and thereby complete coverage of the cake can be ensured, yet the total volume used may be very small, the valve being in a condition providing for wash liquor flow to the belt of cloth only for its short predetermined time.

An important feature of the invention is that once the system has been set, increase or decrease in the frequency of the intermittent forward stepping movements of the belt or cloth has no effect on the efficiency of the system which automatically adjusts to the belt-stepping frequency used at any particular time.

Once a filter cake has been partially washed, any further washing is often difficult since intimate contact between the cake particles and the wash liquor often does not occur due to the wash liquor preferentially travelling through minute channels in the filter cake which have been created during previous filtration and washing steps. Accordingly, a further optional refinement of the filter of the invention lies in the provision of vibratory means to agitate the belt or cloth, and therewith the filter cake, during the period when the vacuum is switched off. This shakes the filter cake up, redistributes the material and re-structures or re-slurries the cake thereby eliminating preferential channelling of wash liquor, greatly increasing contact between the wash liquor and the cake particles and improving the efficiency of the washing operation.

BRIEF DESCRIPTION OF THE DRAWINGS

The invention will be described further by way of example, with reference to the accompanying drawing, in which:

FIG. 4 is a side elevation of a preferred practical embodiment of a horizontal vacuum belt filter to which the present invention is applicable, the supply, drainage and recycling system for wash liquor being omitted when compared to FIG. 1 for the sake of clarity;

FIG. 5 is a rear view of the moveable roller in the direction of the arrows V—V in FIG. 4;

Figure 1:
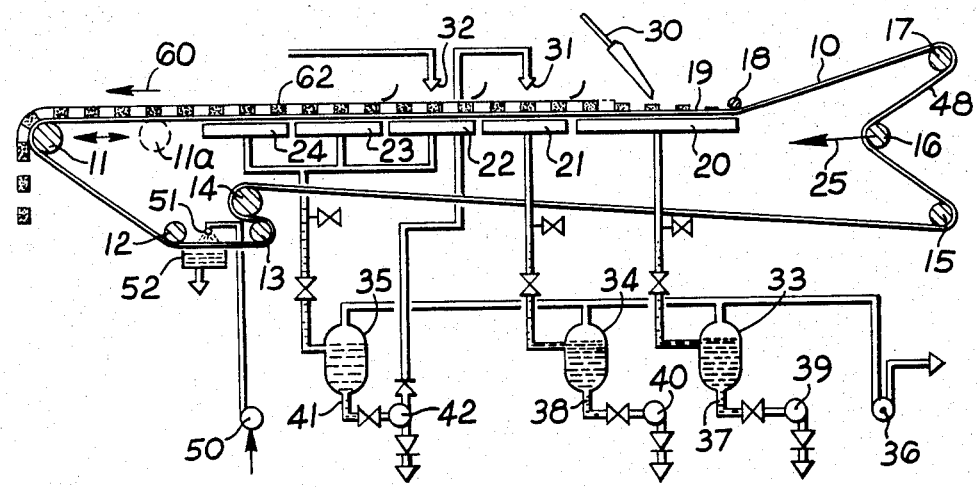
FIG. 1 is a diagrammatic side view illustrating a horizontal vacuum belt filter to which the present invention is applicable.
Figure 2:
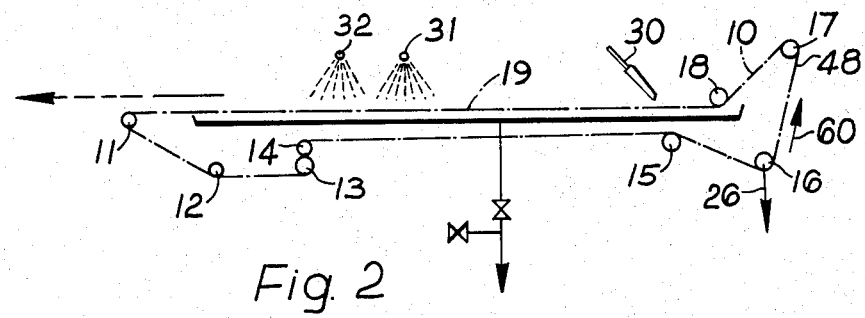
FIG. 2 is a simplified view comparable with FIG. 1, showing a slightly modified embodiment.

Referring firstly to FIGS. 1, 2 and 4, a practical embodiment of the horizontal vacuum belt filter conforming to the invention comprises an endless belt or cloth 10 guided around rollers 11, 12, 13, 14, 15, 16, 17 and 18 to provide an operative upper run 19 which extends over a succession of vacuum boxes 20, 21, 22, 23 and 24. The rollers are typically manufactured out of 6 inch diameter steel tubing with a central shaft of about 2½ inches diameter. None of these dimensions are critical beyond minimum strength requirements. The rollers 11 to 18 are, of course, in practice supported by a framework of uprights and transverse cross-beams, as shown in FIG. 4.

Roller 11 located at the downstream or front end of the upper operative run 19 of the belt 10 is the main drive roller and the extremities of its shaft fit in plummer block ball bearings which are mounted in a yoke 27. This yoke 27 is moveable disposed on top of slides 28, as shown in FIG. 5 and is attached to the piston rod 29 of a pneumatic or hydraulic ram 43 operative to push the roller 11 forwards or backwards so as to reciprocate between an extended position by roller 11 shown in solid lines and a retracted position 11a shown in broken lines in FIGS. 1 and 4.

The guide roller 16 is biased resiliently in the direction indicated by arrow 25 in FIG. 1 or in the direction indicated by the arrow 26 in FIG. 2, to take up slack which would otherwise arise in the belt or cloth 10 when the foremost guide roller 11 moves to its retracted position 11a. For example, as shown in FIG. 4, the extremities of the shaft of the roller 16 may be located in respective slots 44 in opposing frame members 49 and have a suspended weight 45 connected thereto by cord or wire. Thus the roller 16 moves relative to the slots 44 between position 16a, shown in dotted lines to take up slack in the belt 10 when the roller 11 is retracted, and the position of the roller 16 shown in solid lines when the roller 11 is extended and the weight moves correspondingly between lower position 45a and upper position 45.

At least one of the guide rollers 13, 14, as shown in FIGS. 1 and 2 is fitted with an appropriate mechanism which restricts its direction of rotation such that the belt or cloth 10 may travel only in the direction indicated by the arrow 60. FIG. 4 illustrates how this may be put into effect in practice, both rollers 13, 14 incorporating pawl and ratchet mechanisms 46 thereby permitting belt movement only in the desired direction. Also, in the illustrated embodiment, the rollers 13, 14 form part of a secondary drive arrangement in the lower run of the belt 10. The remaining rollers 12, 15, 17 and 18 are fixed deflection and support rollers and serve only to guide the belt 10 in the required path. Further belt tracking devices 47 are shown in FIG. 4.

Intermittent forward motion of the filter belt 10 is achieved in the following manner. Starting from the condition in which the parts are in the dotted line condition, i.e. the main drive roller is in its retracted position 11a and moveable guide roller 16 is in position 16a, a vacuum is applied to vacuum boxes 20 to 24 so that the operative upper run 19 of the belt 10 cannot move. Slurry supplied to the upper run 19 from feed inlet 30 is subjected to the vacuum and is dried to remove its liquid content leaving behind a filter cake on the upper run 19. After a predetermined time, the vacuum is switched off and the upper run 19 of the belt is released for movement. Piston rod 29 of ram 43 extends to its solid line position, and, since the ratchet devices 46 on the rollers 13, 14 will not permit movement of the belt 10 in the reverse direction to the arrow 60, the movement of the piston rod 29 draws a length of belt out of the bight 48 between the guide rollers 15, 17 into the upper run 19. The roller 16 is thus drawn into its solid line position 16, at the extreme right of FIG. 4.

Once the aforesaid operations are completed, the vacuum to the vacuum boxes 20 to 24 is switched on again so that once again the operative upper run 19 is prevented from moving. The piston rod 29 is retracted to its dotted line position and the resultant slack is drawn into the lower return run of the belt 10, via the nip provided by the rollers 13, 14, by movement of the roller 16 to the left in the FIGS. 1 and 4 under the influence of the weight 45 to the dotted line position 16a. The bight 48 is thus restored to its original length.

The above cycle of operations is performed repetetively and as a result the slurry is converted into solid filter cake with progressively reduced liquid content as it moves along the upper run 19 of the belt 10. Eventual dry product separates from the belt either at the roller 11 or the guide roller 12.

The combined effect of the roller 16, the movement of the foremost guide roller 11 and the unidirectional effect of one or both of the rollers 13, 14 is to ensure that each extension of the foremost guide roller 11 causes a stepping movement of the upper run 19 of the belt or cloth 10.

As intimated, a feed slurry supply nozzle or weir box 30 serves, as will be described later, to supply to the belt or cloth 10, just in advance of the guide roller 18 on the upper run 19 above the vacuum box 20, a slurry required to be filtered using the apparatus.

As shown in FIG. 1, a first wash liquor nozzle 31 is disposed above the upper run 19 above the vacuum box 21 and a second wash liquor nozzle 32 is correspondingly disposed above the vacuum box 22.

The vacuum box 20 is connected to a vacuum receiver 33; the vacuum box 21 is connected to a vacuum receiver 34; the three vacuum boxes 22, 23 and 24 are connected together and to a common vacuum receiver 35. All three vacuum receivers 33, 34 and 35 are connected, by their upper parts, to a common vacuum pump 36.

Outlets 37 and 38 from the lower parts of the vacuum receivers 33 and 34 are connected to respective pumps 39, 40 for liquid therefrom to be directed away from the apparatus, e.g. for subsequent treatment or for discharge. On the other hand outlet 41 from the common receiver 35 leads to a pump 42 whose outlet is valved to enable its output to be directed away from the apparatus (as above discussed) or to be directed to the first wash liquor nozzle 31.

A pump 50 serves to supply washing liquid to a belt or cloth washing nozzle 51 disposed above the belt or cloth 10 between the guide rollers 12 and 13 so that washing liquid sprayed onto the belt or cloth 10 by the nozzle 51 washes all residue from the belt or cloth 10 into a tank 52.

For slurry deposition and filtration, with the roller 11 in the withdrawn or retracted dottedline position at 11a, the slurry is supplied by way of the nozzle or weir box 30 whilst the belt or cloth 10 is stationary and vacuum is applied to the vacuum boxes 20 to 24 by the pump 36. Liquid from the receivers 33, 34 and 35 is drawn away as described. During the slurry feed, the nozzle or weir box 30 may be vibrated and/or displaced either transversely or longitudinally of the belt or cloth 10, as may be appropriate for the material being treated. After a predetermined period of time, a mechanism (not shown) is triggered to switch off the vacuum to the vacuum boxes 20 to 24, and to actuate the hydraulic or pneumatic ram 43 to cause the roller 11 to be moved to the extended full line position in FIG. 1, thereby stepping the upper run 19 of the belt or cloth 10 forward by one step in the direction of the arrow 60. The vacuum is then switched on again, whilst the ram retracts the roller 11, so that filtration continues, with solid material from the slurry building up as filter cake indicated diagrammatically at 62 on the operative upper run 19 of the belt or cloth 10.

For washing the filter cake 62, an appropriate wash liquor is supplied to the nozzle 32 from which it sprays onto the filter cake 62 through which it passes to be taken up by the vacuum boxes 22, 23 and 24. According to the setting of the valve controlling the output of the pump 42, the liquid from the boxes 22 to 24 can either be directed away from the apparatus or can be recirculated to the first wash liquor nozzle 31.

Figure 3:
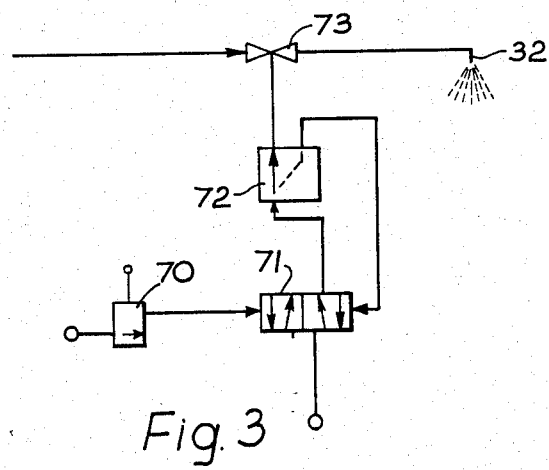
FIG. 3 is a simplified circuit diagram illustrating a practical embodiment of control arrangement suitable for the wash liquor supply or the feed slurry supply in the apparatus of FIGS. 1 and 2.

Turning now to FIG. 3, this figure illustrates diagrammatically, a control arrangement. A respective one of these may be provided for controlling the slurry supply to the nozzle or weir box 30, and/or the wash liquor supply to the second wash liquor nozzle 32 and/or the recirculated wash liquor supply to the first wash liquor nozzle 31. The figure shows the control arrangement applied to the nozzle 32 and as illustrated includes a switch 70 which is arranged so as to be actuated simultaneously with the triggering of the ram 43 which displaces the roller 11. Upon such triggering, the switch 70 supplies an impulse to a control valve 71 which serves, through a timer 72, to open a shut-off valve 72 which controls the supply of wash liquor to the nozzle 32. Accordingly, wash liquor is supplied to the nozzle 32 only for a predetermined period of time, as set by the timer 72, which is adjustable, which thereupon is operative to actuate the control valve 71 and shut-off the wash liquor.

The timer 72 may, of course, be any locally commercially available timer. It must, however, be able to re-set itself automatically, be adjustable for time interval and be capable of making a positive contact after the pre-set time interval has expired. By setting the timer 72, one can provide for a predetermined amount of wash liquor to be supplied to the filter cake 62, upon each stepping movement of the belt or cloth 10, and this wash liquor feed will vary automatically and in proper proportion with an increase or decrease in the frequency of the stepping movement of the belt or cloth 10 and does not need individual adjustment upon such increase or decrease being effected.

A comparable arrangement can readily be incorporated in the feed line for recirculated liquor supplied to the first wash liquor nozzle 31.

Most important, however, is the fact that the slurry supply to the nozzle or weir box 30 can also incorporate a comparable arrangement, and this will, once it is appropriately adjusted, ensure that the slurry feed to the belt or cloth 10 is directly related to the progressing or stepwise movement of the belt or cloth 10 regardless of any adjustment of the frequency of movement thereof.

Using the above-described system, the slurry or wash liquor can, for example, be pumped or caused to flow in a continuous loop at a rate which is ideal for the pipeline, the pump system and the type of material, a branch leading from the loop having a valve which is opened on a timed basis. As long as flow through the loop is kept constant, the amount of slurry or liquid distributed through the valve can be accurately measured simply by adjusting the time period during which the valve is open. For example, if a volume of 5 liters (1.10 gallons) per minute is required to be evenly spread across a filter belt, the slurry or liquid in the loop could be circulated at a suitable rate, e.g. 20 liters (440 gallons) per minute, and the branch valve only open for 15 seconds in every minute, thereby releasing the required 5 liters (1.10 gallons) per minute although the actual rate of flow through the system is much higher.

This system eliminates all the flow and distribution problem set out in the introduction hereto and is much simpler and trouble free than systems wherein flow is controlled by flow-meters, variable speed pumps and compensating valves. Moreover, this system is only practical with an intermittently moving filter belt since, each time the belt moves or remains stationary a large quantity of liquid can be introduced for a short period. (This would obviously not be possible with a continuously moving belt).

Figure 7:
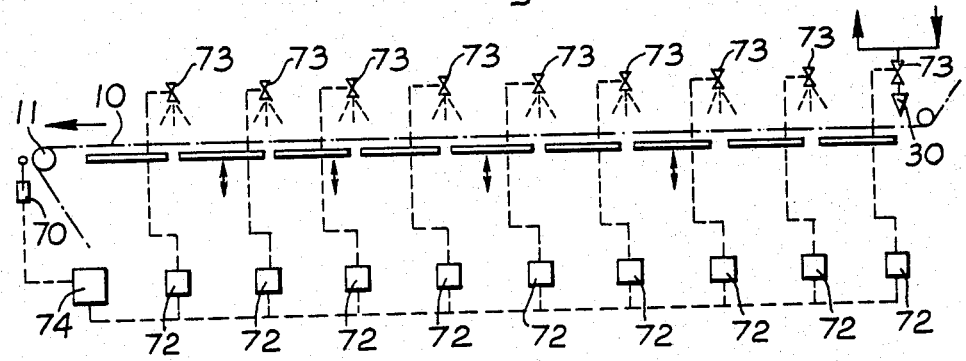
FIG. 7 is a schematic diagram of a timercontrolled wash liquor and slurry supply system of a modified embodiment of the invention.
Figure 8:
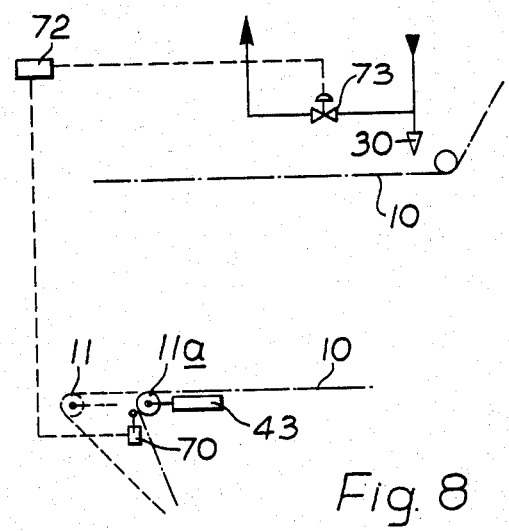
FIG. 8 is an enlarged schematic diagram illustrating how intermittent slurry supply may be achieved according to the invention.

Further examples of the timer-and-valve-controlled wash liquor and slurry feed system proposed by the invention are illustrated diagrammatically in FIGS. 7 and 8. When the guide roller 11 moves to the left to its extended position, it trips the switch 70 (which may be electric, pneumatic or hydraulic) to actuate a master timer 74 which in turn actuates the individual timers 72 to open or close valves 73 for a pre-set time. Each timer 72 may, of course, if required, open or close respective valves 73 for different pre-set periods. The master timer 74 is a safety device causing the whole circuit to cut off after a maximum time delay. Each time the roller 11 is extended, exactly the same sequence will occur so that as a portion of belt or cloth 10 and the cake thereon is moved stepwise forward, wash liquor is introduced for a certain time and slurry is introduced for a given time to replenish that which has moved forward.

Figure 6:
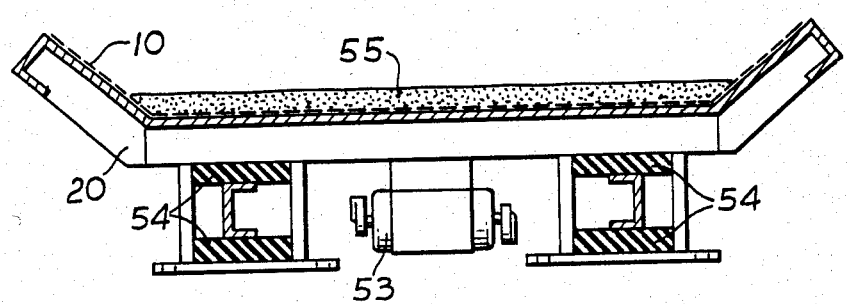
FIG. 6 is a detailed cross-section of a vibrator and vacuum tray which is included in the preferred embodiment of the filter of the invention.

As hereinbefore set forth, the efficiency of cake washing is considerably enhanced if the filter cake is shaken up and re-slurried during the washing procedure. There are various methods of vibrating a horizontal filter belt and the cake deposited thereon, but the preferred means in the present case are vibrators attachable to the underside of one or more of the vacuum boxes or trays 20 to 24 so as provide vibratory trays which cause vibration of the overlying portion of the belt 10 and thus re-structuring and re-slurrying of the cake formed thereon. A typical arrangement of vibratory tray is illustrated in FIG. 6. A vibrator 53, which can be any commercially available vibrator, e.g. electric or air-operated, as long as it has variable frequency is bolted onto the underside of one of the vacuum trays 20, which is mounted upon rubber pads 54 to as to be capable itself of vibrating.

Most filter cakes are thixotropic which means that they will display flow properties if subjected to mechanical action. Since the filter cake (designated by reference numeral 55) lies firmly against the tray 20 when a vacuum is applied thereto, when the tray 20 vibrates, the vibrating action of said tray 20 is imparted to the cake 55 causing it to flow together. In this way, any cracks or channels in the cake will disappear so that further dewatering can take place and thorough cake washing be effected.

The invention is not confined to the precise details of the foregoing example, and variations may be made thereto. Naturally it is not essential that the control should be applicable only to machines having means for supplying both slurry and wash liquor and it can be employed in cases where only a slurry supply *or* a wash liquor supply is present.

I claim:

1. A filter belt assembly comprising in combination:
a filter belt disposed in an endless configuration defining a substantially horizontal upper run and a return lower run strategically entrained over a system of frame-mounted rollers, a slurry supply means for charging a slurry onto the top side of the upper run, a wash liquor supply means for feeding a wash liquor onto the top side of the upper run, a recirculated wash liquor supply means for feeding a recirculated wash liquor onto the top side of the upper run, a vacuum means disposed beneath the upper run for drawing the liquid content from the slurry and wash liquors through the belt with the remaining solid content of the slurry being deposited in cake form upon the top side of the upper run, a drive means for effecting incremental forward movement of the upper run relative to the vacuum means, a variable valved control means operative upon commencement of each increment of forward movement of the upper run for allowing slurry charging during a first pre-set time period of the forward movement and for preventing slurry charging at all other times and also for allowing wash liquor charging during a second pre-set time period of the forward movement and for preventing wash liquor charging at all other times in the obtainment of a thin and even spread of the slurry on the upper run and an adequate washing thereof, the control means including a first pipeline loop and a first pump operative for causing slurry to flow therearound continuously, a first branch leading from the loop to the slurry supply means, a first valve means disposed in the first branch, a first timer for causing the valve to be opened only for the first pre-set time period, a second pipeline loop and a second pump operative for causing wash liquor to flow therearound continuously, a second branch leading from the loop to the wash liquor supply means, and a second valve means disposed in the second branch, and a second timer for causing the second valve to be opened only for the second pre-set time period.

* * * * *